United States Patent
Smith et al.

[11] Patent Number: 5,838,514
[45] Date of Patent: Nov. 17, 1998

[54] METHOD AND APPARATUS FOR CALIBRATING A THERMAL RESPONSE OF A MAGNETORESISTIVE TRANSDUCER

[75] Inventors: Gordon J. Smith; Hal Hjalmar Ottesen, both of Rochester, Minn.

[73] Assignee: International Business Machines Corporation, Armonk, N.Y.

[21] Appl. No.: 697,217

[22] Filed: Aug. 21, 1996

[51] Int. Cl.⁶ .................................................. G11B 13/00
[52] U.S. Cl. ........................ 360/75; 360/77.03; 360/135
[58] Field of Search ................... 360/75, 27, 46, 360/67, 77.03, 78.11, 113, 135

[56] References Cited

U.S. PATENT DOCUMENTS

| | | |
|---|---|---|
| 4,802,033 | 1/1989 | Chi . |
| 5,070,495 | 12/1991 | Bletscher, Jr. et al. . |
| 5,084,791 | 1/1992 | Thanos et al. . |
| 5,185,681 | 2/1993 | Volz et al. . |
| 5,418,770 | 5/1995 | Ide et al. . |
| 5,424,885 | 6/1995 | McKenzie et al. . |
| 5,430,706 | 7/1995 | Utsunomiya et al. .................. 360/113 |
| 5,455,730 | 10/1995 | Dovek et al. ........................ 369/275.1 |
| 5,527,110 | 6/1996 | Abraham et al. ..................... 360/75 X |
| 5,666,237 | 9/1997 | Lewis ........................................ 360/75 |

*Primary Examiner*—Aristotelis M. Psitos
*Assistant Examiner*—James L. Habermehl
*Attorney, Agent, or Firm*—Mark A. Hollingsworth

[57] ABSTRACT

A method and apparatus for calibrating a thermal response of an MR element spaced apart from a surface of a data storage disk is disclosed. A calibration feature, such as a depression, is provided on a surface of the disk. Signals are read from the calibration depression and a location on the disk surface other than the calibration depression using the MR element. Magnetic and thermal spacing signals are produced using the readback signals. A calibrated thermal spacing signal is produced using the magnetic spacing signals and the thermal spacing signals, such that the calibrated thermal spacing signal varies proportionally or, alternatively, linearly with respect to variations in spacing between the MR element and the disk surface. The calibration methodology is preferably performed in-situ a data storage system.

20 Claims, 12 Drawing Sheets

METHOD AND APPARATUS FOR CALIBRATING A THERMAL RESPONSE OF A MAGNETORESISTIVE TRANSDUCER

RELATED APPLICATIONS

This application is related to co-pending applications U.S. Ser. Nos. 08/581,877; 08/581,906; 08/581,981; and 08/582,555, all of which were filed on Jan. 2, 1996 and assigned to the assignee of the instant application, and the contents of which are incorporated herein by reference.

FIELD OF THE INVENTION

The present invention relates generally to data storage systems and, more particularly, to a method and apparatus for calibrating a thermal response of a magnetoresistive (MR) transducer employed in a data storage system.

BACKGROUND OF THE INVENTION

A typical data storage system includes a magnetic medium for storing data in magnetic form and a transducer used to write and read magnetic data respectively to and from the medium. A disk storage device, for example, includes one or more data storage disks coaxially mounted on a hub of a spindle motor. The spindle motor rotates the disks at speeds typically on the order of several thousand revolutions-per-minute. Digital information is typically stored in the form of magnetic transitions on a series of concentric, spaced tracks comprising the surface of the magnetizable rigid data storage disks. The tracks are generally divided into a plurality of sectors, with each sector comprising a number of information fields, including fields for storing data, and sector identification and synchronization information, for example.

The actuator assembly typically includes a plurality of outwardly extending arms with one or more transducers and slider bodies being mounted on flexible suspensions. A slider body is typically designed as an aerodynamic lifting body that lifts the transducer head off of the surface of the disk as the rate of spindle motor rotation increases, and causes the head to hover above the disk on an air-bearing produced by high speed disk rotation. The distance between the head and the disk surface, typically on the order of 50–100 nanometers (nm), is commonly referred to as head-to-disk spacing.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals, commonly referred to as readback signals, in the read element.

Conventional data storage systems generally employ a closed-loop servo control system for positioning the read/write transducers to specified storage locations on the data storage disk. During normal data storage system operation, a servo transducer, generally mounted proximate the read/write transducers, or, alternatively, incorporated as the read element of the transducer, is typically employed to read information for the purpose of following a specified track (track following) and locating (seeking) specified track and data sector locations on the disk.

Within the data storage system manufacturing industry, much attention is presently being focused on the use of an MR element as a read transducer. Although the MR transducer, typically incorporating an MR read element and a thin-film write element, would appear to provide a number of advantages over conventional thin-film heads and the like, it is known by those skilled in the art that the advantages offered by the MR transducer are not fully realizable due to the present inability of data storage systems to accommodate a number of undesirable MR transducer characteristics.

In particular, MR element transducers introduce a distortion in the sensed magnetic signal, which typically represents data or servo information stored on a magnetic storage disk. The distortion to the magnetic signal is caused by many factors, including a number of undesirable characteristics inherent in the MR element and the specific configuration and orientation of the MR element when incorporated into an MR transducer assembly. Notwithstanding such undesirable characteristics, the data storage system manufacturing community continues to expend resources to develop improved MR transducers.

Several techniques have been developed to convert the magnetic signal induced in an MR transducer to a spacing signal that varies as a function of head-to-disk spacing changes. For example, the magnetic spacing signal has been used in defect screening procedures in an effort to detect the presence of anomalous disk surface features. Such anomalous features are typically associated with excessively large head-to-disk spacing changes or disk surface contact events.

In order to conduct a survey of a disk surface using such a conventional approach, magnetic information must first be written to the disk surface from which the magnetic spacing signal is subsequently produced. It is appreciated by those skilled in the art that writing magnetic information to a disk surface for purposes of conducting defect screening is a time consuming and costly process. By way of example, a conventional high capacity data storage system may include ten data storage disks, each of which has two data storing surfaces. Associated with each of the twenty data storing disk surfaces is an MR transducer. Although twenty MR transducers may be used to write magnetic information to the twenty disk surfaces, such a conventional data storage system includes only a single write channel which must be multiplexed, or time-shared, across the twenty MR transducers. As such, the magnetic information is written to each of the twenty disk surfaces one surface at a time.

Assuming that each of the twenty data storing surfaces is formatted to include 6,000 tracks per inch (TPI), and the disks are rotated at a rate of 7,200 revolutions per minute (RPM), and further assuming typical delays associated with actuator and MR transducer positioning, it will take approximately one minute to write the magnetic information to each of the twenty data storing surfaces, or approximately twenty minutes to process all of the twenty disk surfaces. Only after the magnetic information is written to the twenty disk surfaces can a conventional disk surface surveying procedure be performed.

Further, it is known that a magnetic spacing signal incorrectly indicates the presence of certain surface features, such as magnetic voids, as variations in the topography of a disk surface. Moreover, contact between the MR transducer and the disk surface can result in wearing of the magnetic film provided on the disk surface, thereby producing a magnetic void at the abraded disk surface location.

There exists a keenly felt need in the data storage system manufacturing community for an apparatus and method for reducing the cost and time currently expended when conducting a survey of a disk surface using an MR transducer. There exists a further need to provide such an apparatus and method which is not compromised by the undesirable characteristics inherent in an MR transducer. The present invention is directed to these and other needs.

SUMMARY OF THE INVENTION

The present invention is a method and apparatus for calibrating a thermal response of an MR element spaced apart from a surface of a data storage disk. A calibration feature, such as a depression, is provided on a surface of the disk. Signals are read from the calibration depression and a location on the disk surface other than the calibration depression using the MR element. Magnetic and thermal spacing signals are produced using the readback signals. A calibrated thermal spacing signal is produced using the magnetic spacing signals and the thermal spacing signals, such that the calibrated thermal spacing signal varies proportionally or, alternatively, linearly with respect to variations in spacing between the MR element and the disk surface. The calibration methodology is preferably performed in-situ a data storage system.

BRIEF DESCRIPTION OF THE DRAWINGS

FIG. 12 illustrates a relationship between the periodic spacing measurements in time and the corresponding physical positions on the disk surface relative to the length of the calibration trough.

DETAILED DESCRIPTION OF THE EMBODIMENTS

Figure 1:
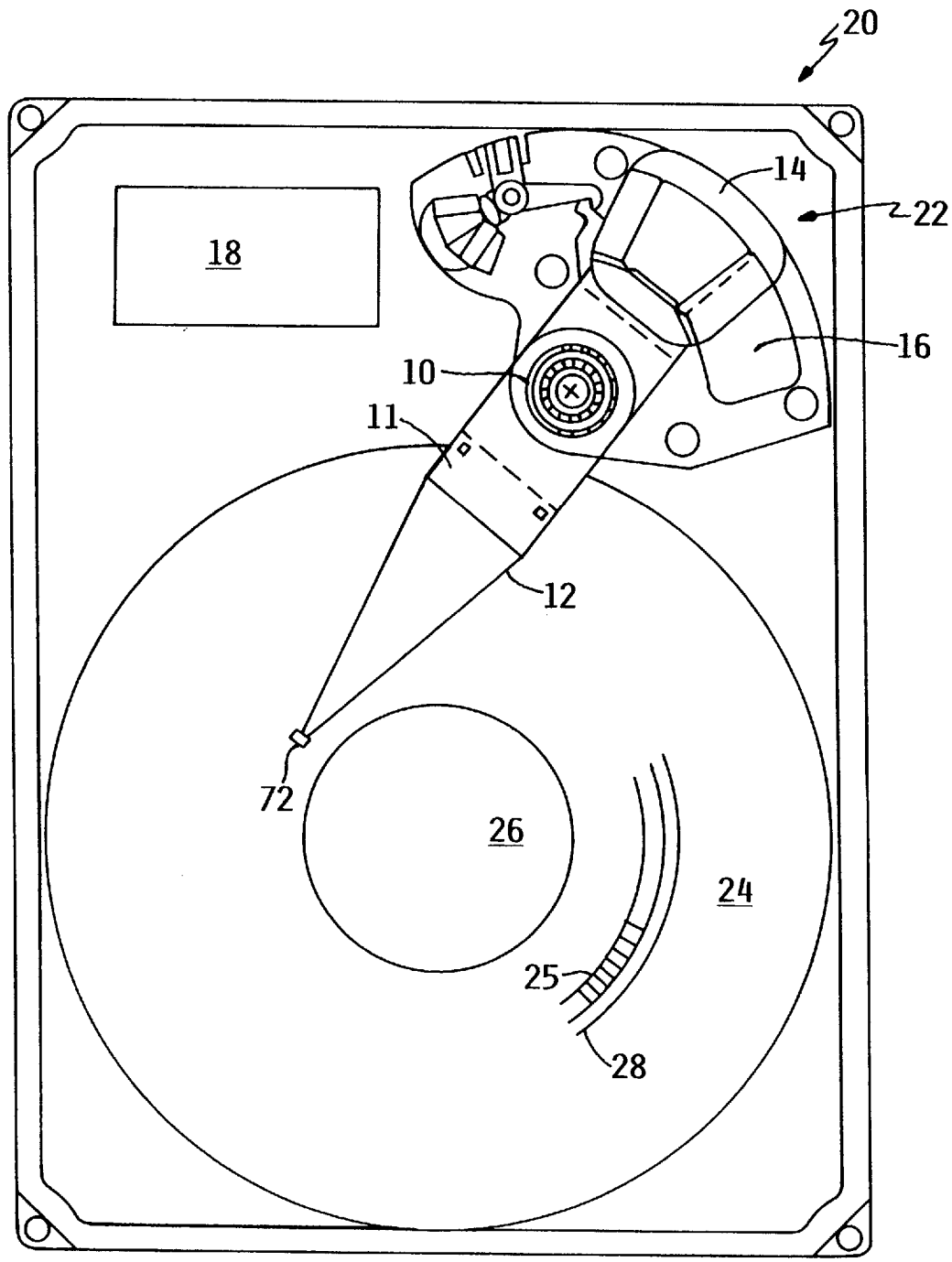
FIG. 1 is a top view of a data storage system with its upper housing cover removed.

The present invention is an apparatus and method for calibrating a thermal response of an MR transducer. The present invention may be advantageously employed to survey the surface topography of a data storage disk and to accurately and reliably detect disk surface features and defects. A calibration methodology is employed to calibrate the thermal response of the MR transducer so as to produce a calibrated thermal spacing signal which may be used to perform disk surface surveying and defect detection.

In accordance with this embodiment, the present invention obviates the traditional approach of using a magnetic signal induced in the MR transducer to analyze a disk surface. The time consuming and expensive process of initially writing magnetic information to the entire disk surface prior to performing a conventional glide test is thus eliminated. Magnetic information need only be written to the calibration region, which may be a single track, when employing the calibration methodology of the present invention. By way of example, the conventional approach described in the Background of the Invention requires that approximately twenty minutes be expended to write magnetic information to the twenty disk surfaces prior to performing the survey. In stark contrast, providing magnetic information at the calibration region of twenty disk surfaces in accordance with the methodology of the present invention is typically accomplished in approximately one minute. Further, the present invention provides for increased accuracy when performing disk surface feature detection and head-to-disk spacing determinations as contrasted to conventional approaches that utilize magnetic information written to the disk surface.

An important advantage of the present invention concerns the ability to detect head-to-disk spacing changes in-situ, or within the housing of the data storage system, using the thermal response of the MR element. In-situ head-to-disk spacing measurements using the thermal response of the MR element is useful for purposes of disk manufacturing testing and screening, and for performing predictive failure analysis (PFA) during the service life of the data storage system in the field. The thermal spacing signal can further be used to detect head contact with the surface of a data storage disk.

The magnitude of the thermal signal induced in an MR transducer is generally a function of the particular MR element used in the MR transducer. Variations in the manufacturing process and materials used, for example, will generally cause variations in the response of an MR element. Thus, in order to accurately determine head-to-disk spacing change using the thermal response of an MR transducer, it is desirable to calibrate the thermal response in-situ using the magnetic response. Accurate magnetic spacing change information, for example, may be obtained using the well-known Wallace spacing loss equation. A calibration depression, such as a radial trough, trench, or pit, may be fabricated in the landing zone of the data storage disk and used to produce both thermal and magnetic signal modulation for purposes of performing in-situ thermal spacing calibration. The magnetic spacing change can be accurately determined for the calibration trough which, in turn, can be used to calibrate the thermal voltage response of the MR element.

Referring now to the drawings and, more particularly, to FIG. 1, there is illustrated a data storage system 20 employing MR transducers 72. The data storage system 20 typically includes one or more rigid data storage disks 24 which rotate about a spindle motor 26. An actuator assembly 10 typically includes a plurality of interleaved actuator arms 11 and suspensions 12, with each suspension supporting one or more MR transducers 72 for reading and writing information respectively to and from the data storage disks 24.

The actuator assembly 10 includes a coil assembly 14 which cooperates with a permanent magnet assembly 16 to operate as an actuator voice coil motor 22 responsive to control signals produced by a controller 18, which typically includes, or is coupled to, a processor. The controller 18 coordinates the transfer of data to and from the data storage disks 24, and cooperates with the actuator voice coil motor 22 to move the actuator arms/suspensions 11/12 and MR transducers 72 to prescribed track 28 and sector 25 locations when reading and writing data to and from the disks 24.

Figure 2:
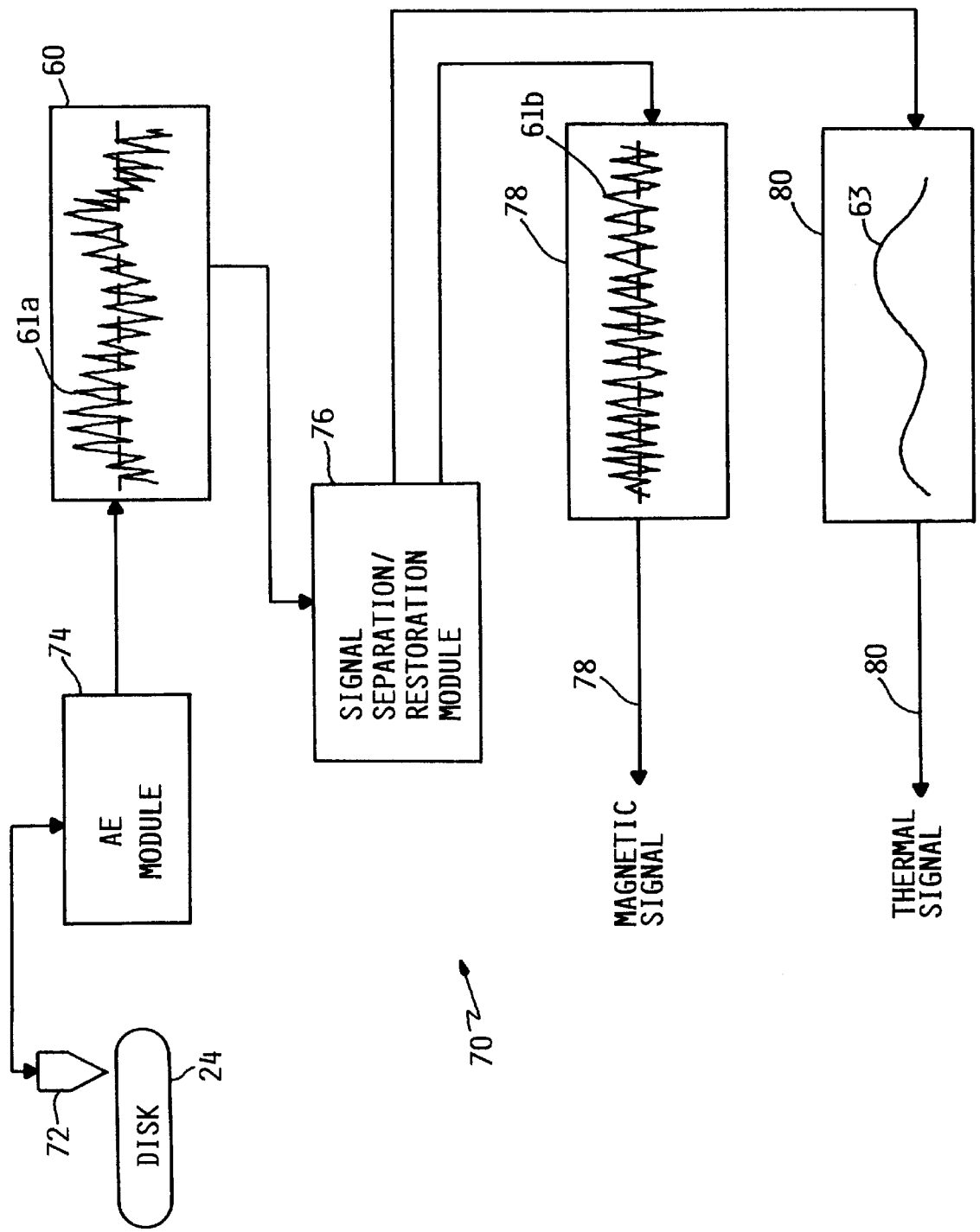
FIG. 2 is a block diagram of an apparatus for extracting a thermal signal and a magnetic signal from a readback signal induced in an MR transducer.

In FIG. 2, there is shown an apparatus 70 for reading an information signal having a magnetic signal component and a thermal signal component from a magnetic storage medium and for separating the thermal and magnetic signal components from the information signal. The information signal is processed to extract the thermal signal component from the information signal, and to remove the influence of the thermal signal component from the magnetic signal. The two independent magnetic and thermal signals extracted from the information signal may then be utilized individually or in combination to enhance the operation, performance, and reliability of the data storage system.

In particular, and as discussed in detail hereinbelow, a magnetic spacing signal, which is developed from the magnetic signal component and is proportional to the magnetic spacing, may be advantageously used to calibrate the thermal response of the MR transducer 72. A thermal spacing signal, in turn, may then be developed to accurately and reliably determine spacing changes between the MR transducer 72 and a surface of the disk 24.

In FIG. 2, an MR element 72 is shown in close proximity with a surface of a data storage disk 24. The information read by the MR element 72 from the disk 24 is generally referred to herein as a readback signal. The readback signal produced in the MR element 72 is typically amplified by the arm electronics (AE) module 74. Filtering of the readback signal by the AE module 74 may also be performed. As shown in graphical form at the output of the AE module 74, the analog readback signal 60, containing a relatively high frequency magnetic signal component 61a, exhibits a distorted D.C. baseline due to the presence of a low frequency modulating signal component. It is appreciated by those skilled in the art that a modulated readback signal 60, or more particularly, a modulated magnetic signal component 61a of the readback signal 60, has long been identified as one source of a number of data storage system maladies, including servo control errors and inaccuracies, causing a reduction in data storing and retrieving reliability, and, in some cases, an irretrievable loss of data.

As is discussed in detail in the related co-pending applications identified hereinabove, it has been discovered by the inventors that the readback signal 60 is a composite signal comprising independent magnetic and thermal signal components, and that the low frequency modulation in the readback signal is, in actuality, an independent thermal information signal component of the readback signal 60. Importantly, the up-to-now bothersome thermal signal component of a readback signal, referred to generally herein as the thermal signal, also includes an informational content which may be extracted from the readback signal 60 and utilized for a variety of advantageous purposes heretofore unappreciated by those skilled in the art, including, for example, determining any change in the flyheight of the MR element 72 with respect to a disk surface 24 to an accuracy on the order of 1 nanometer, and can be utilized for a number of other purposes, including disk surface analysis and topographical mapping, glide testing including disk defect detection and screening, error correction, and predictive failure analysis (PFA), for example.

Figure 3:
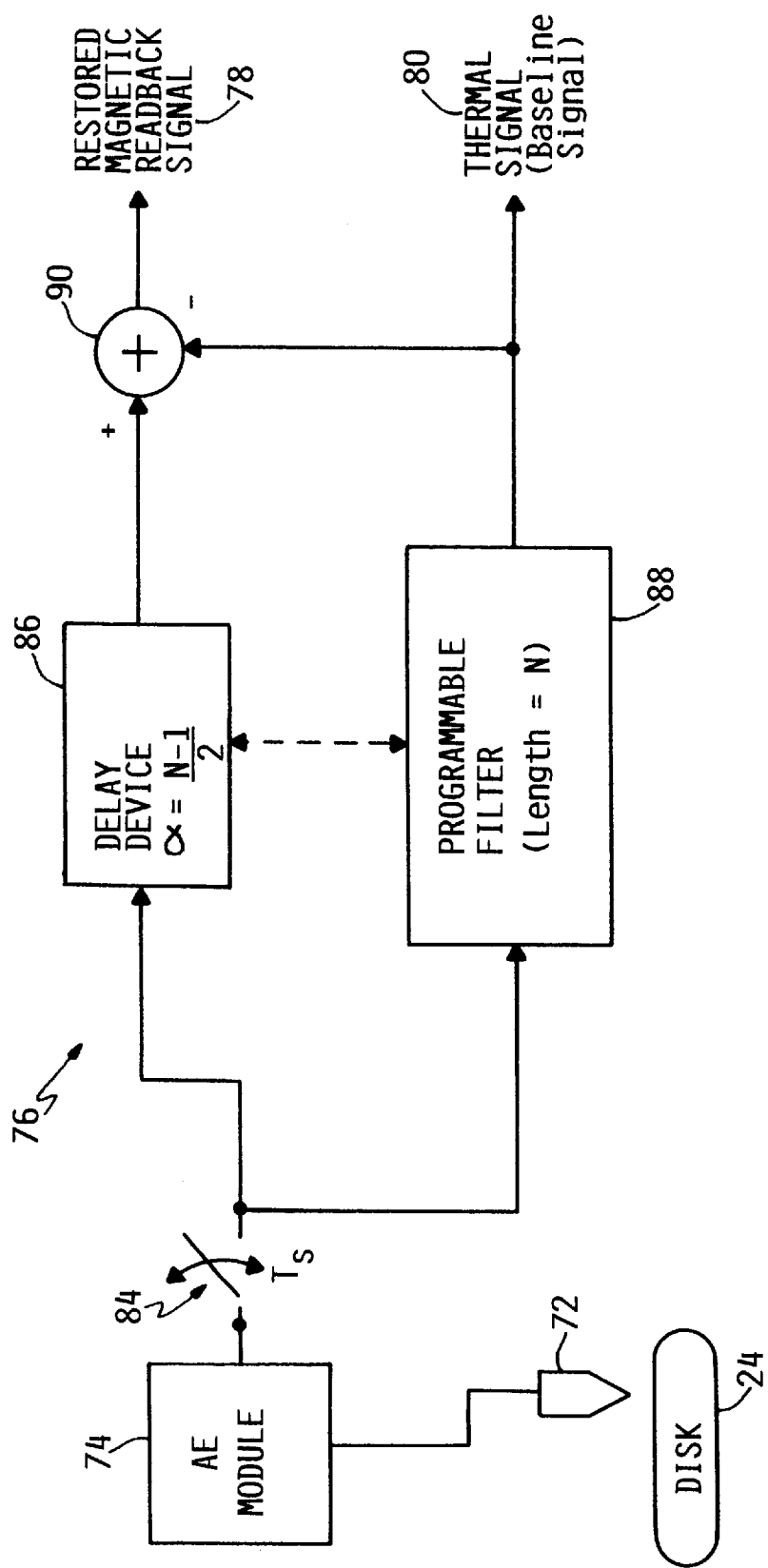
FIG. 3 is a block diagram of a signal separation/restoration module for extracting a thermal signal and a magnetic signal from a readback signal induced in an MR element.
Figure 4:
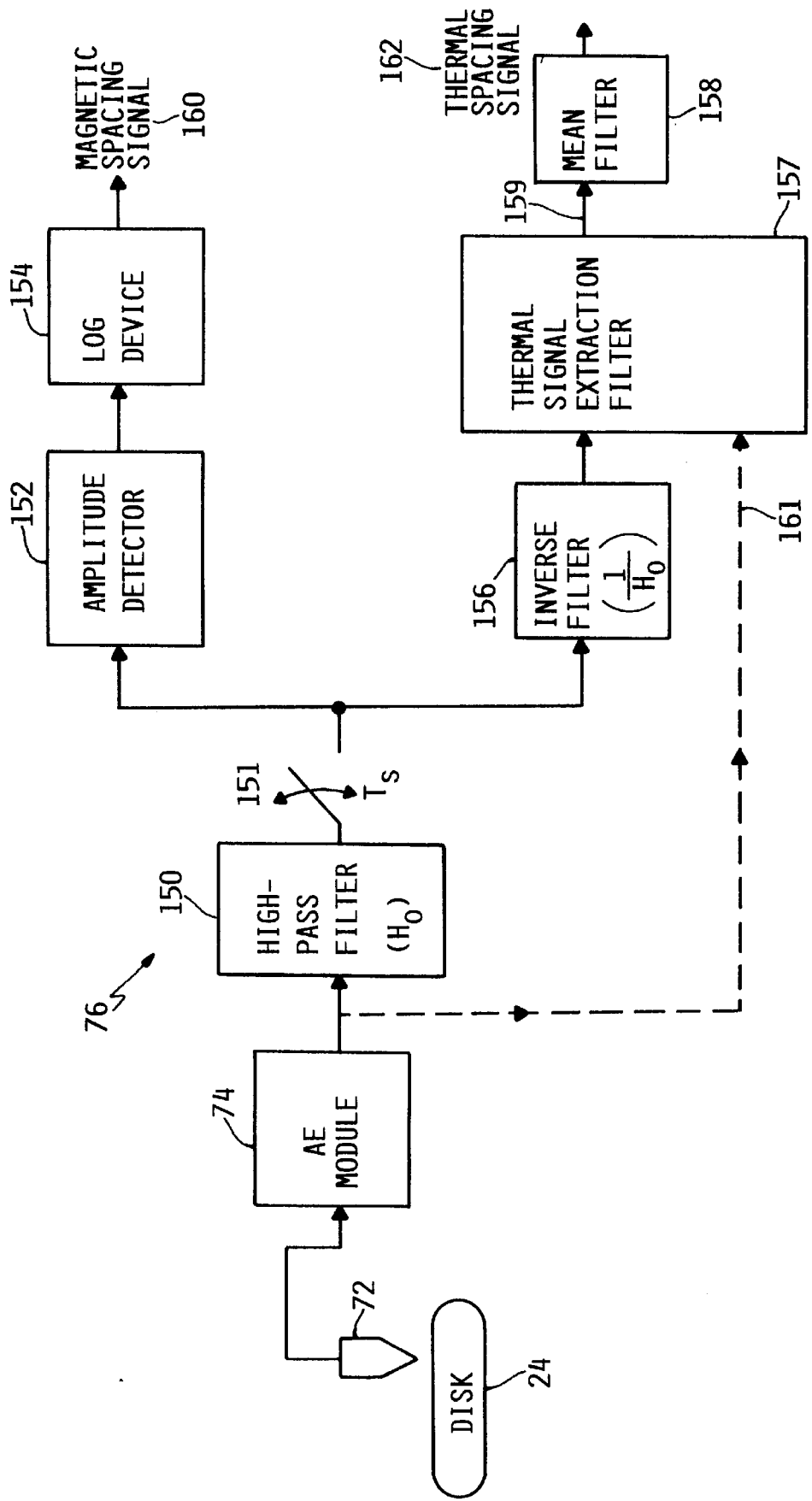
FIG. 4 is a block diagram of another embodiment of a signal separation/restoration module.

Referring to FIGS. 3 and 4, there is illustrated two embodiments of a signal separation/restoration module 76 discussed previously with respect to FIG. 2. The signal separation/restoration module 76 is employed to perform the dual tasks of separating the magnetic signal component from the readback signal 60 to remove low frequency thermal signal component, and, in addition, extracting the thermal signal from the readback signal, thus making available for subsequent processing the informational content of both the magnetic signal and thermal signal in substantially independent form. The two embodiments shown in FIGS. 3 and 4 are described in detail in the related co-pending applications identified hereinabove.

Figure 5:
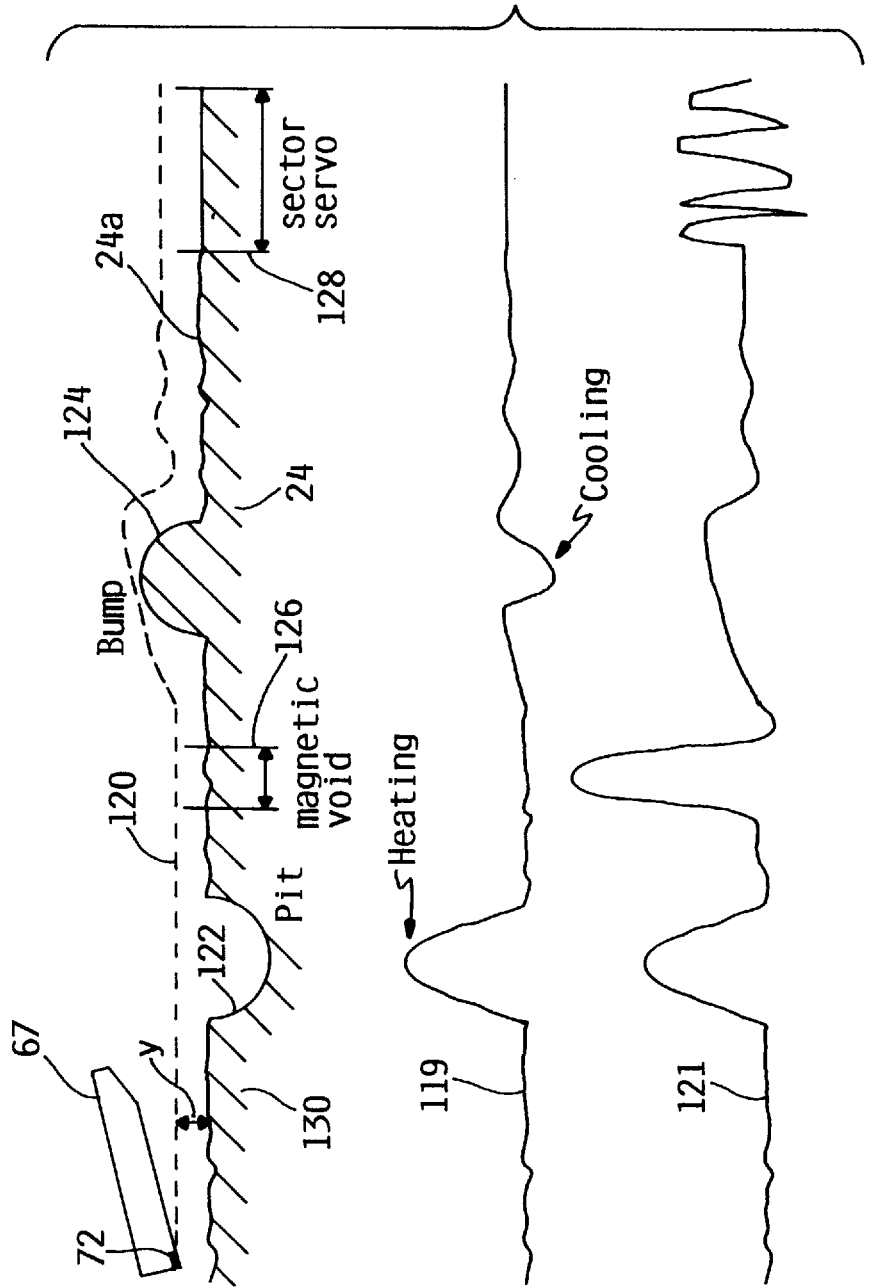
FIG. 5 is an exaggerated side view showing a data storage disk exhibiting various surface defects and features, and a thermal response and magnetic spacing response of an MR element to such defects and features.

Viewing the readback signal in terms of its two independent and separable components reveals a previously unappreciated informational content available in a readback signal obtained using an MR transducer. In particular, information about the surface of the disk can be derived from the thermal signal. An exaggerated side view of an MR slider 67 and MR element 72 in proximity with the surface 24a of a magnetic data storage disk 24 is illustrated in FIG. 5. The disk surface 24a has a generally varying topography at a microscopic level. As is illustrated, a disk surface 24a may include various surface defects, such as a pit 122, a bump 124, or a surface portion 126 void of magnetic material.

As is shown in FIG. 5, the thermal response voltage level 119 of the MR element 72 changes as a function of the spacing, denoted by parameter y, between the MR element 72 and the disk surface 24a. Changes in the magnetic readback signal result from changes in the resistance of the MR element 72. More particularly, a typical MR element, which is a resistor that is sensitive to the presence of magnetic fields, is electrically coupled to a current source between positive and negative element leads. A bias current is applied to the MR element 72 via the leads. In normal operation, magnetic fields created by magnetic transitions on the disk surface 24a affect the resistance of the MR element 72 giving rise to voltage variations across the MR element 72. These voltages occur at the frequency of the magnetic data transitions recorded on the disk surface 24a and are the basis for the magnetic signal component of the readback signal.

The resistance of the MR element 72 is also effected by the head-to-disk spacing. More particularly, head-to-disk spacing changes result in concomitant changes in heat transfer from the MR element 72, which is heated by a constant bias current, to the disk 24. The heat transfer is an inverse function of the head-to-disk spacing. If the heat transfer from the MR element 72 is increased (small spacing), then the temperature of the MR element 72 and its resistance will decrease. The temperature and the resistance of the MR element 72 will increase (larger spacing) if the heat transfer is reduced. Thus, changes in the heat transfer between the MR element 72 and the disk 24 results in an alteration of the temperature of the MR element 72.

Temperature changes in the MR element 72 result in corresponding changes in the electrical resistance of the MR element 72 and, therefore, the voltage across the MR element 72 being supplied by a constant bias current. It is noted that variations in slider flyheight typically occur at a frequency significantly lower than that of the magnetic transitions. Therefore, such temperature changes in the MR element 72 occur at a frequency significantly lower than the magnetic data transitions and are the basis of the thermal component of the readback signal.

As FIG. 5 further illustrates, there is an inverse relationship between the topographical surface variations of the disk 24 and the changes in magnitude of the thermal voltage signal 119. As the instantaneous head-to-disk spacing (y) increases, there results a corresponding increase in air space insulation between the MR element 72 and the disk surface 24a, thereby causing an increase in the temperature in the MR element 72. This temperature increase in the MR element results in a corresponding increase in the MR element 72 resistance due to the positive temperature coefficient of the MR element material typically used to fabricate the MR element 72. Permalloy, for example, is a preferred material used to fabricate the MR element 72 and demonstrates a temperature coefficient of $+3 \times 10^{-3}/°C$. An MR element 72 passing over a bump 124 on the disk surface 24a, by way of example, results in increased heat transfer occurring between the MR element 72 and the disk surface 24a, thereby causing cooling of the MR element 72. Such cooling of the MR element 72 causes a decrease in the MR element resistance which, in turn, results in a corresponding decrease in the voltage $V_{TH}$ across the MR element 72 at a constant bias current.

As a result of the above-described interaction between the MR element 72 and the disk surface 24a, it can be seen by referring to the pit 122 depicted on the disk surface 24a that the thermal voltage signal $v_{TH}$ 119 across the MR element 72 increases in amplitude as a function of increasing head-to-disk separation distance (y). It can further be seen by referring to the bump 124 depicted on the disk surface 24a that the thermal voltage signal $v_{TH}$ 119 decreases in amplitude as a function of decreasing head-to-disk separation distance. For purposes of convenience, it may be desirable to invert the thermal voltage signal $v_{TH}$ 119 so that changes in disk surface 24a topography correspond directly, rather than inversely, to changes in the thermal voltage signal $v_{TH}$ 119. Thus, the negative value of the MR transducer voltage, $-v_{TH}$, will provide a qualitative indication of the disk surface 24a topography by indicating "cooling areas" as peaks and "heating areas" as valleys.

Also shown in FIG. 5 is a magnetic spacing signal 121 which has been conditioned to correspond to variations in the disk surface 24a. It can be seen that the magnetic spacing signal 121 incorrectly indicates the presence of some surface features, such as magnetic voids 126, as variations in the topography of the disk surface 24a. It can further be seen that the magnetic spacing signal 121 provides an inferior indication of other surface features, such as bumps 124, when compared to disk surface imaging information provided by use of the thermal signal 119.

Figure 6:
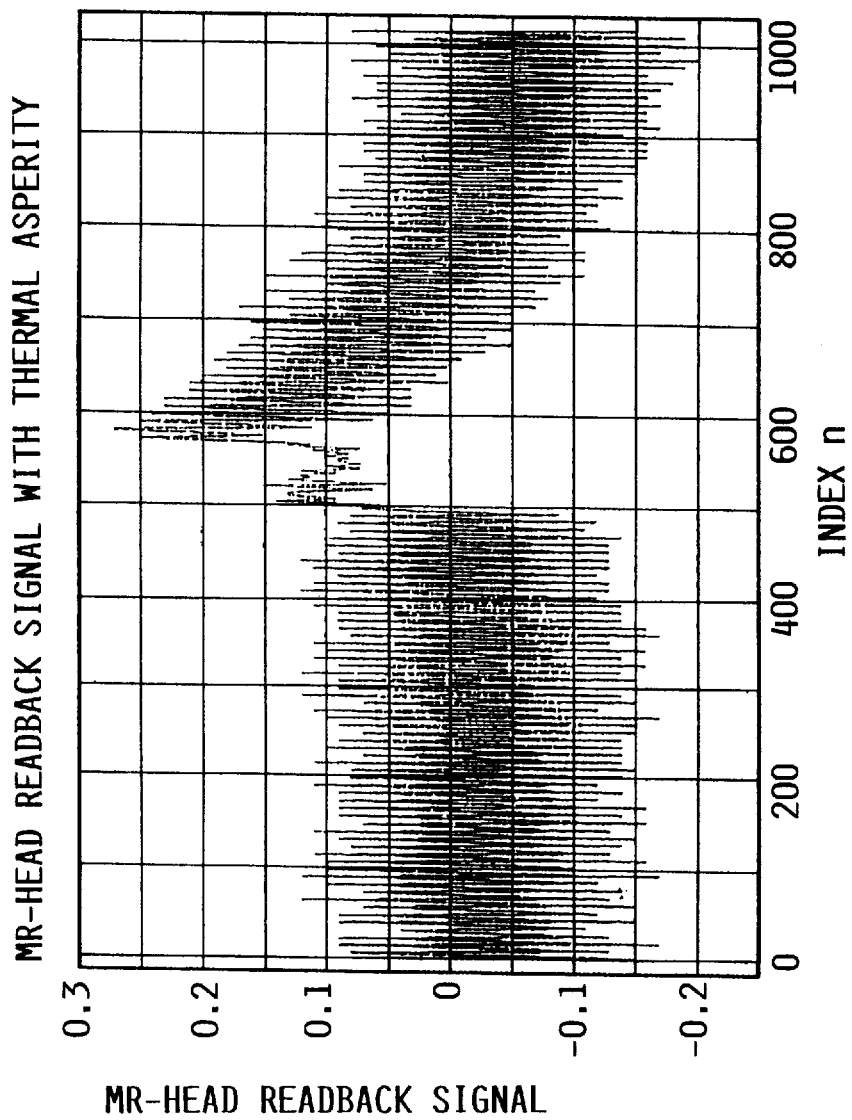
FIG. 6 is a showing of a readback signal from an MR transducer indicating a head-to-disk contact event.

Another characteristic of an MR element 72 that influences the nature of the readback signal obtained from the disk surface concerns a situation whereby the MR element 72 comes into physical contact with the disk surface or other obstruction. A thermal asperity, for example, occurs when a temporary physical contact occurs between the disk surface and the MR element 72. The negative (cooling) peak of the thermal voltage response to a bump 124, for example, is suddenly replaced by a large, but narrow, positive spike response followed in rapid succession by the negative cooling response as shown in FIG. 6. The positive spike response is caused by mechanical frictional heating between the MR element 72 and the local asperity on the disk surface 24a. Due to the mechanical friction associated with a thermal asperity, the magnetic coating can be scraped off in the area of physical contact. This will result in a magnetic void 126, but is not the only source of such voids.

In order to quantitatively assess disk surface topography variations and head-to-disk spacing changes using the thermal signal component of a readback signal, it is desirable to calibrate the thermal voltage response of the MR element 72. As mentioned previously, accurate information about the change in magnetic spacing may be obtained using the well-known Wallace spacing loss equation. A calibration feature provided on a surface of the data storage disk 24 may be used to produce both thermal and magnetic signal modulation for purposes of performing in-situ thermal spacing calibration. A calibrated thermal voltage response of the MR element may then be obtained by using the magnetic spacing signal.

Figure 7:
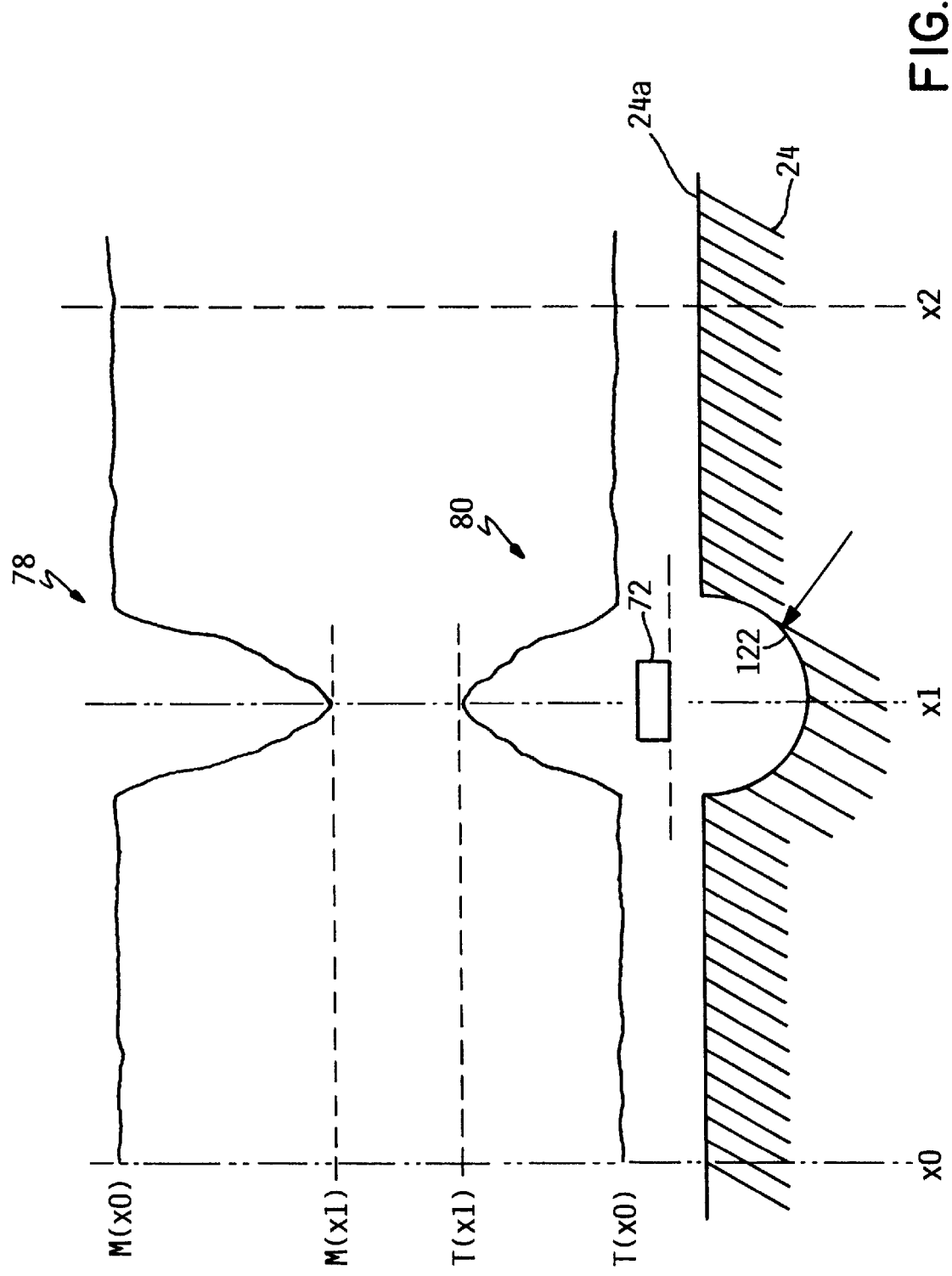
FIG. 7 is an exaggerated view showing an MR element passing over a pit on a portion of a disk surface, and a thermal response and magnetic response of the MR element to the pit.

Turning now to FIG. 7, there is shown an exaggerated depiction of an MR element 72 situated above a manufactured pit 122 located on the disk surface 24a. It is assumed that the illustrated portion of the disk surface 24a is coated with a thin magnetic layer. For purposes of illustration, it is assumed that the pit 122 is located on a track of the disk surface 24a over which the MR element 72 traverses. As such, the portion of the disk surface 24a depicted in FIG. 7 has been previously magnetized. As can been seen, a magnetic signal component 78 of the readback signal induced in the MR element 72 decreases in magnitude as the MR element 72 passes between a location $x_0$ on the disk surface 24a adjacent the pit 122 and the bottom of the pit 122 at a location $x_1$. It can further be seen that the magnetic signal component 78 increases in magnitude as the MR element 72 passes between the bottom of the pit 122 at location $x_1$ and a location $x_2$ on the disk surface 24a beyond the pit 122. As is further shown in FIG. 7, a thermal signal component 80 of the readback signal induced in the MR element 72 increases in magnitude as the MR element 72 passes between disk surface location $x_0$ and the bottom of the pit 122 at location $x_1$. Between the bottom of the pit 122 at location $x_1$ and disk surface location $x_2$, it can be seen that the thermal signal component 80 decreases in magnitude as the MR element 72 passes over and beyond the pit 122.

As discussed briefly hereinabove, the depth of the pit 122 may be determined by application of the Wallace spacing loss equation. The magnetic spacing loss may, in turn, be used to calibrate the thermal response of the MR element 72. After calibrating the thermal response of the MR transducer 72, spacing changes between the MR element 72 and the disk surface 24a may be quantitatively determined using the thermal voltage response of the MR element 72.

A significant advantage that is realized when utilizing a calibrated thermal voltage response of the MR element 72 for determining head-to-disk spacing measurements concerns the capability to accurately evaluate the topography of a non-magnetized disk surface. Another advantage realized by detecting head-to-disk spacing variations using a calibrated thermal spacing signal, rather than a magnetic spacing signal, concerns a significant increase in imaging resolution when detecting disk surface features and defects that is realized by using the thermal spacing signal. As discussed previously with respect to FIG. 5, a magnetic spacing signal, in contrast to a thermal spacing signal, incorrectly indicates the presence of certain surface features such as magnetic voids, as variations in the topography of the disk surface 24a. Further, bumps, defects, and other protruding surface features are detected with significantly greater resolution when the thermal spacing signal is used instead of the magnetic spacing signal.

Referring again to the illustration of FIG. 7, it is assumed that the magnitude of the magnetic signal 78 (peak-to-peak) is given by M(x), where the variable x represents a location on the disk surface 24a over which the MR element 72 traverses, including the pit 122. It is further assumed that the thermal signal 80 associated with the magnetic signal at a particular disk surface location x is given by T(x). As the MR element 72 traverses over the disk surface 24*a* and, in particular over the pit 122, a magnetic signal minimum occurs at the deepest portion of the pit 122 at a disk surface location $x_1$. This magnetic signal minimum is represented as $M(x_1)$. It is further shown that a corresponding thermal signal maximum occurs at the deepest portion of the pit 122 at disk surface location $x_1$ and is represented by the thermal signal $T(x_1)$.

It is further assumed that average magnetic and thermal signals may be obtained at a disk location $x=x_0$, where disk location $x_0$ is adjacent to, but not included within, the pit 122. The average magnetic and thermal signals at disk location $x_0$ are represented as $M_{avg}(x_0)$ and $T_{avg}(x_0)$, respectively. Applying the Wallace spacing loss equation using the magnetic signals obtained at disk locations x and $x_0$ to develop a magnetic spacing difference signal, the depth of the pit 122 is given by the following Equation:

$$\left(\frac{\lambda}{2\pi}\right)[\ln(M_{avg}(x_0)) - \ln(M(x_1))] \quad [1]$$

where, $\lambda$ represents the recorded wavelength of the magnetic information written to this region of the disk surface 24*a*.

Ideally, $\lambda$ is a constant along the recorded magnetic track which has been written in the calibration region of the disk surface 24*a*. The relative depth of the pit 122 using the thermal signal 80 is given by the thermal spacing difference signal $[T(x_1)-T_{avg}(x_0)]$. It is noted that the thermal signal 80, as discussed hereinabove, increases in magnitude for increasing head-to-disk spacing due to an increase in the temperature in the MR element 72 and the corresponding increase in MR element resistance due to the positive temperature coefficient of the MR element material typically used to fabricate the MR element 72. As such, the output voltage of the MR element 72 increases with increasing head-to-disk spacing. The thermal sensitivity coefficient $S_T$ of the thermal response of the MR element 72, and hence its calibration, is given by the following Equation:

$$S_T = \frac{\left(\frac{\lambda}{2\pi}\right)[\ln(M_{avg}(x_0)) - \ln(M_{avg}(x_1))]}{[T(x_1) - T_{avg}(x_0)]} \quad [2]$$

where, $S_T$ represents the thermal calibration sensitivity which has units of nanometers per millivolt (nm/mV).

The estimated spacing change $\Delta\hat{y}(x)$ at a disk location x may be obtained from Equation [3] below:

$$\Delta\hat{y}(x) = S_T \Delta T(x) \quad [3]$$

where, $\Delta T(x)=T(x)-T(x_0)$; $\Delta\hat{y}(x)=\hat{y}(x)-\hat{y}(x_0)$, and $\hat{y}(x_0)$ represents the estimated average head-to-disk separation. It can be seen that the estimated spacing change given by $\Delta\hat{y}(x)$ at disk location x, calibrated using an application of Wallace's spacing loss equation with the magnetic response, is a linear equation. Equation [3] is valid for small spacing variations around the nominal spacing between the MR element 72 and the surface 24*a* of a data storage disk 24. When the head-to-disk spacing approaches very close to zero, such as when the MR element 72 nearly contacts a feature on the disk surface 24*a*, the estimated spacing change $\Delta\hat{y}(x)$ in Equation [3] is instead represented by a non-linear equation. It is noted that such a near contact event between the MR element 72 and a feature on the disk surface 24*a* results in a more pronounced thermal response in the MR element 72.

Figure 8:
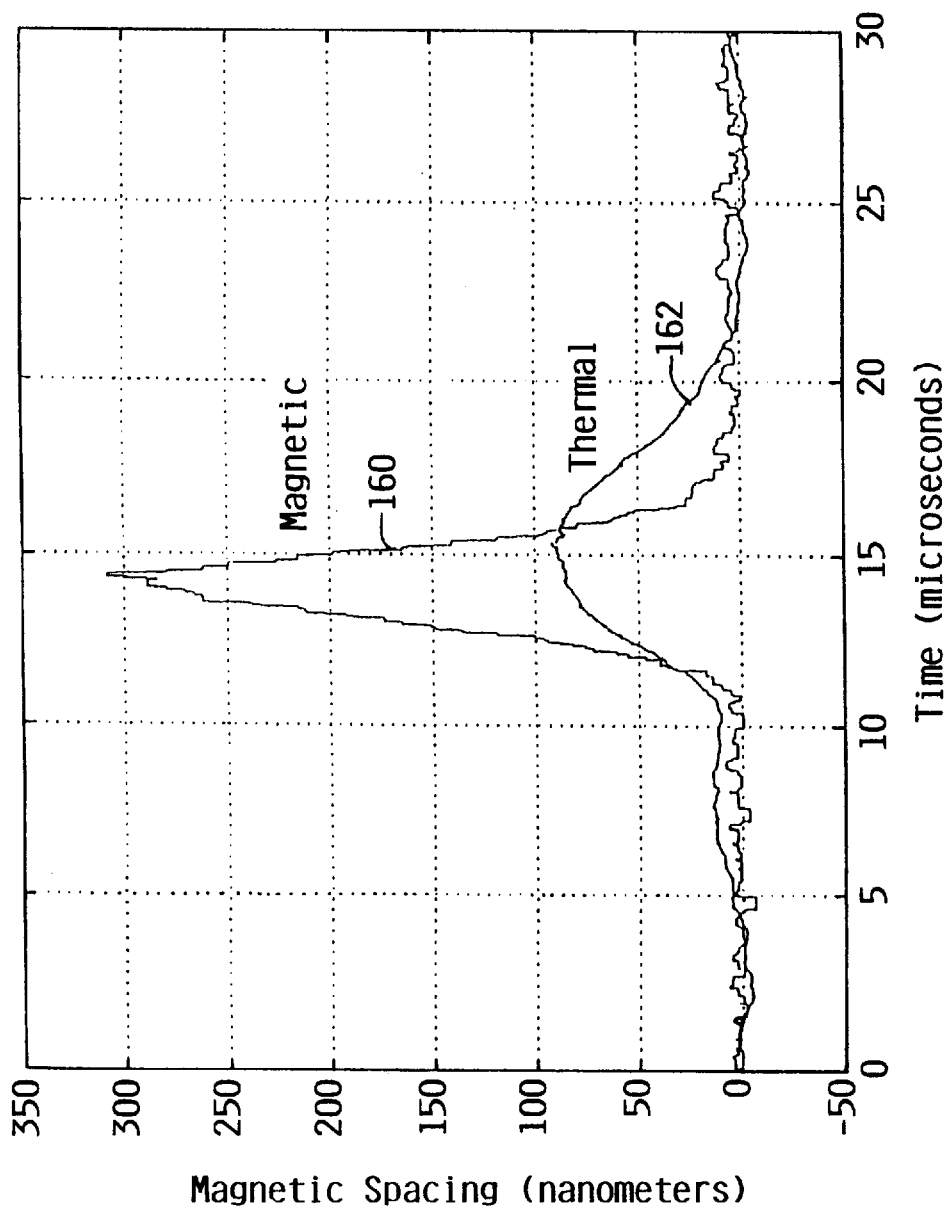
FIG. 8 is a showing of close correspondence between magnetic and thermal head-to-disk spacing signals associated with detection of a disk surface pit.

The illustration provided in FIG. 7 diagramatically demonstrates the correlation of magnetic and thermal signal component variations as a function of MR element flyheight or head-to-disk spacing. In FIG. 8, there is shown the magnetic and thermal response of an MR element 72 for a pit 122 on a disk surface 24*a* as measured in-situ a data storage system. The thermal spacing signal 162 shown in FIG. 8 is illustrated together with the magnetic spacing signal 160. It is noted that the illustrated thermal spacing signal 162 has been corrected for signal distortion introduced by the AE module 74 in a manner described in the above-identified related applications, and the magnetic spacing signal 160 has been developed using the Wallace spacing loss technique described in equation form in Equation [1] above. It can be seen in FIG. 8 that, except for a difference in signal height and a slightly longer time constant associated with the thermal spacing signal 162, the magnetic spacing signal 160 and thermal spacing signal 162 describe a disk surface pit, such as the pit 122 shown in FIG. 5. The thermal spacing signal 162 may be calibrated using the linearized magnetic spacing signal 160 in order to accurately reflect true head-to-disk spacing change, as is discussed in greater detail hereinbelow.

The discussion of the relationship between the magnetic and thermal spacing signals provided thus far has been directed to the characterization of a generic pit 122 or other depression of unknown dimensions on a magnetized portion of a disk surface 24*a*. Having described the generalized thermal calibration sensitivity relationship in the above-presented Equation [2] for a generic pit 122, it is desirable to provide a calibration feature having known dimensions that may be repeatedly used for calibrating the thermal response of an MR element in-situ a data storage system. It is to be understood, however, that the calibration methodology disclosed herein may be employed in environments other than in-situ a data storage system.

Figure 9:
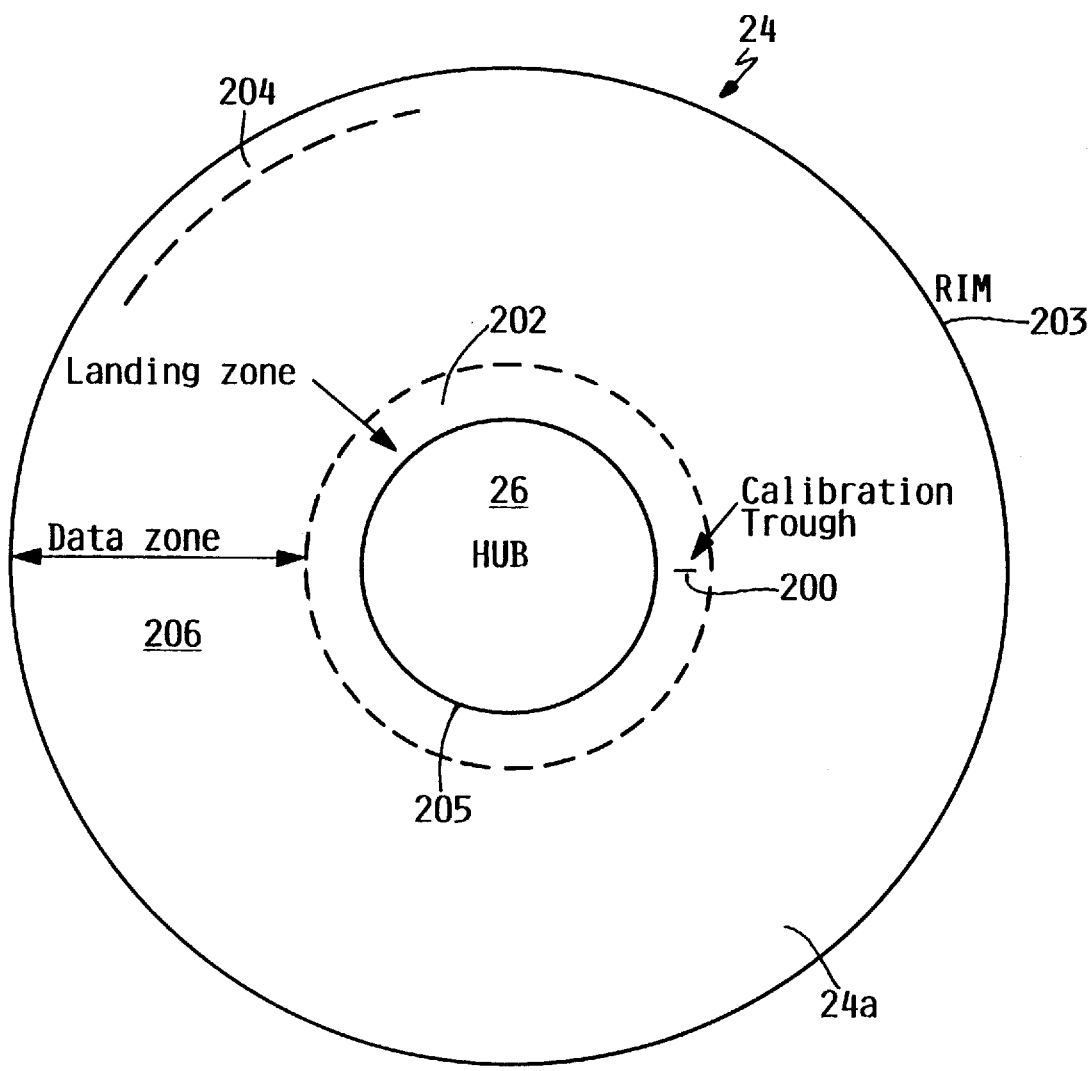
FIG. 9 is a depiction of a data storage disk in top plan view including a calibration feature in the form of a trough.
Figure 10:
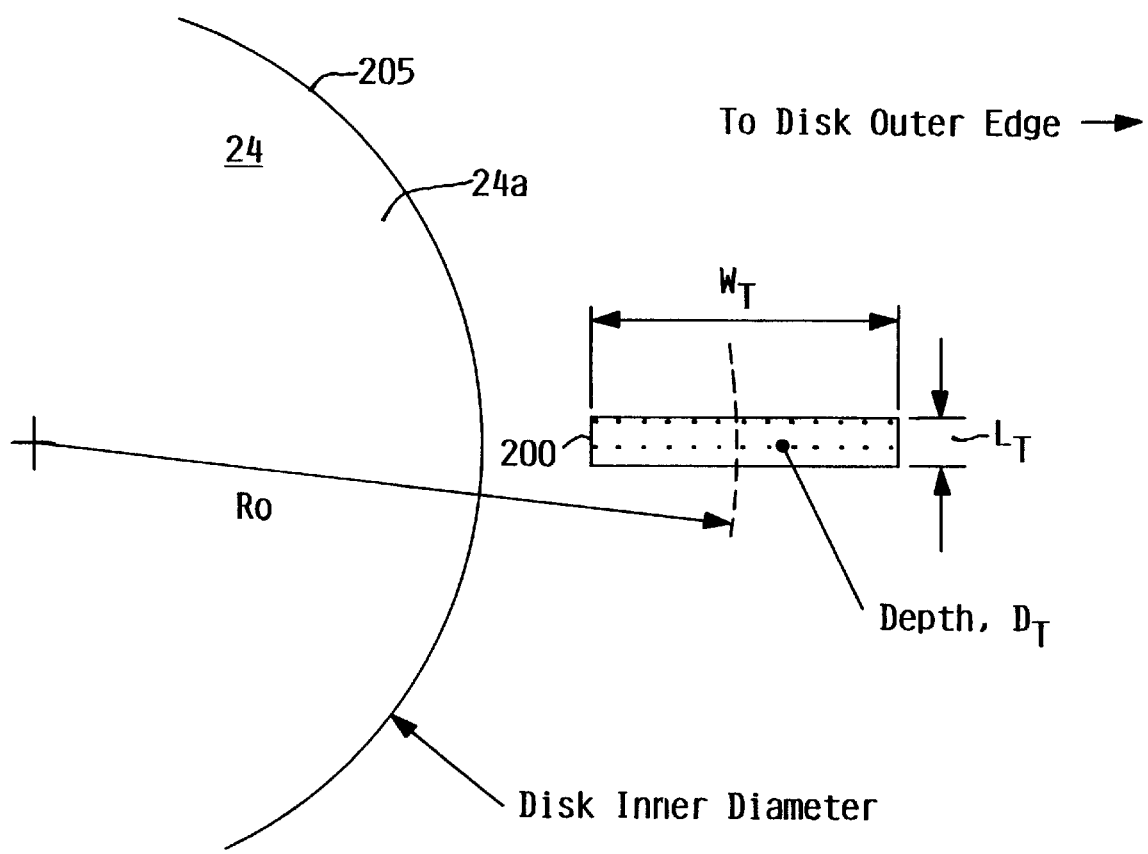
FIG. 10 is an exploded view of the calibration trough shown in FIG. 9.

Turning now to FIGS. 9 and 10, there is illustrated one embodiment of a data storage disk 24 having a calibration feature 200 provided in a calibration region on the disk surface 24*a*. The calibration feature 200 is used to perform in-situ calibration of the thermal voltage response of the MR element 72. In general, the dimensions of the calibration feature 200 should be similar in scale to the types of defects and surface features of interest, such as those that are expected to be detected during glide testing, pits in the disk surface for example. It is noted that the calibration region of the disk surface 24*a* is constituted by the calibration feature 200 and at least one location on the disk surface 24*a* other then the location of the calibration feature 200. As such, it can be appreciated that a requirement to magnetize only the calibration region in order to effectuate the calibration methodology of the present invention translates into a considerable time and cost savings to the manufacturer.

In accordance with this embodiment, a calibration feature 200 is provided in a landing zone 202 situated between an inner diameter 205 of the disk 24 and a data zone 206 of the disk 24. Alternatively, the calibration feature 200 may be provided at a disk location other than the inner landing zone 202. By way of example, the calibration feature 200 may be provided on the disk surface 24*a* in an outer landing zone 204 defined between an outer diameter 203 of the data storage disk 24 and the data zone 206. The situs of the calibration feature 200 on the disk surface 24*a* should be selected such that the calibration feature 200 is detectable by both the magnetic and thermal response of the MR element 72, and should be situated so as not to adversely affect the airbearing created between the rotating disk surface 24*a* and the slider body 67 that supports the MR element 72. The location of the calibration feature 200 may also be selected as a location where the slider body 67 is positioned during system start-up or power-down.

In order to reliably locate the calibration feature 200 on the disk surface 24a for purposes of performing the calibration procedure, a reference may be established for the calibration region. In an embodiment in which the calibration feature 200 is located in an inner landing zone 202, an inner diameter crash stop (not shown) may be employed as such a reference. When writing magnetic information to the calibration region, which includes the calibration feature 200, the actuator 10 may be positioned against the crash stop while a track of magnetic information is written to the calibration region. Subsequently, when performing a calibration procedure, the actuator 10 may be positioned against the crash stop which appropriately registers the MR element 72 above the calibration region and feature 200.

As is discussed in greater detail below, the location and size of the calibration feature 200 must accommodate various mechanical and systemic worst case tolerances of the data storage system, including, for example, disk runout (i.e., perturbation in disk and/or spindle motor/hub rotation), and MR transducer and slider configuration and orientation tolerances. Alternatively, magnetic servo information may written to the calibration region to provide calibration feature location information for the servo control. Servo information written in the landing zone 202, however, may be degraded over time due to intended contact between the slider 67 and the magnetic layer disposed over the calibration region.

In one embodiment, the calibration feature comprises a calibration trough 200 which is provided in the inner landing zone 202 situated between the inner diameter 205 and data zone 206 of the data storage disk 24. In another embodiment, the calibration feature may comprise a calibration bump disposed at an appropriate disk surface location. Although such a calibration bump may be utilized, a bump is more likely to cause head/disk interference and may cause permanent damage to the head or the disk as a result of a head-to-disk crash. A bump may also cause head lift-off and airbearing modulation and is therefore likely unsuitable for use as a permanent calibration site. Also, a bump is subject to wear and the magnetic film surface of the bump may wear off over time, thereby resulting in a loss of magnetic signal.

Referring now to FIG. 10, there is provided an exaggerated depiction of a calibration trough 200 which, as described, represents an exemplary embodiment of a suitable calibration feature. A calibration trough 200 may be provided on both sides of the disk 24 at an equivalent radial and circumferential location, respectively. Alternatively, the calibration trough 200 provided on one side of the disk 24 may be situated 180 degrees from the location of the calibration trough 200 provided on the other side of the disk 24.

The calibration trough 200 is located on the disk surface 24a such that the center of the calibration trough 200 is situated at a radial distance $R_o$ with respect to the center of the disk 24. The width of the calibration trough 200 in the radial direction is given by the dimension $W_T$. The length of the calibration trough 200 in the circumferential direction is given by the dimension $L_T$, and the depth of the calibration trough 200 in a direction generally perpendicular to the plane of the disk surface 24a is given by the dimension $D_T$.

The general constraints for determining and optimizing the location and dimensions of the calibration trough 200 will, of course, vary depending on the configuration and operational dynamics of a particular data storage system. It is to be understood that the parameters of the calibration trough 200 illustrated in FIGS. 9 and 10 are provided for illustrative purposes only, and do not represent a limitation on the dimensions, configuration, and location of the calibration feature employed. As such, the disclosed parameters are intended to constitute guidelines that may be applied when determining the location and dimensions of a suitable calibration feature.

In general, the center of the calibration trough 200 is located at a radial distance $R_0$ from the center of the disk 24. The radial dimension $R_0$ should be selected such that the MR element 72 is aligned with the center of the calibration trough 200 when the slider 67 is situated in the landing zone 202. For a data storage system employing a disk 24 having a diameter of 3.5", by way of example, an approximate radial dimension $R_0$ may be 18.4 mm. It is understood that the radial dimension $R_0$, as well as other calibration trough dimensions discussed below, will vary depending on, for example, the diameters of the disk and hub, the rate of disk rotation, and the form factor of the data storage system.

The width $W_T$ of the calibration trough 200 should be selected such that the entire MR element 72 can pass over a portion of the calibration trough 200. In addition, tolerances associated with the prescribed position of the slider 67 in the landing zone 202 should also be taken into account. By way of example, a typical worst case (i.e., three sigma) tolerance for accommodating positional misalignment between a particular slider body 67 within an inner landing zone 202 of a 3.5" diameter disk 24 is approximately 1.0 mm. The width $W_T$ of the calibration trough 200, therefore, should be sufficient to accommodate these and other manufacturing tolerances.

As discussed previously in regard to an embodiment which employs an inner diameter crash stop as a reference for registering the MR element 72 with the calibration trough 200, disk runout, which arises due to differences between the center of disk 24 rotation and the center of spindle motor 26 rotation, and other tolerances, such as MR transducer and slider attachment tolerances, must be accounted for when determining an appropriate width dimension $W_T$. To ensure that the entire MR element 72 passes over the calibration trough 200 in accordance with this example, the width dimension $W_T$ should be approximately 1.0 mm. It is noted that the width dimension $W_T$ may be less than 1.0 mm in an embodiment that employs servo patterns in the calibration region of the landing zone 202. Although disk runout and other misalignment problems may be essentially obviated when using such servo patterns, continuous contact between the slider 67 and the calibration region may degrade the servo patterns over time so as to render them unusable or unreliable.

The length of the calibration trough $L_T$ in the circumferential direction is generally related to the rotational velocity of the disk 24 during calibration. It is considered desirable to perform the calibration procedure at the nominal disk velocity, although other velocities may be selected. The spatial resolution and the temporal resolution of the measured signal induced in the MR element 72 when passing over the calibration trough 200 are related vis-à-vis the circumferential disk velocity at a given track radius. In general, as the disk velocity is increased, the length $L_T$ of the calibration trough 200 should be increased.

The length $L_T$ of the calibration trough 200 has associated with it two independent constraints. A first constraint concerns the effect that the calibration trough 200 may have on the airbearing produced between the slider body 67 and the rotating disk surface 24a. Generally, the length dimension $L_T$ of the calibration trough 200 should be selected to ensure that the calibration trough 200 has only a negligible effect on the airbearing. As such, the length $L_T$ of the calibration trough 200 should be relatively small as compared to the length of the airbearing. A second constraint concerns the ability to reliably and correctly detect the calibration trough 200, which is influenced by the selected disk velocity. The length dimension $L_T$ should be large enough so that the magnetic and thermal responses fall within the detection bandwidth of the respective instrumentation.

With regard to the airbearing constraint, it is reasonable to assume that the circumferential length dimension $L_T$ of the calibration trough 200 should be less than about one-tenth the airbearing length which, in one embodiment, is approximately 2.0 mm. Secondly, in order to determine a meaningful magnetic spacing change, the length dimension $L_T$ must be long enough to ensure magnetic detection. Assuming that the magnetic spacing detector employed can resolve a 75 kHz separation modulation, the minimum length dimension $L_T$ of the calibration trough 200 may be approximately 0.18 mm. The thermal detection bandwidth, in contrast, is typically on the order of 200 kHz, so that the limiting bandwidth is generally that of the magnetic spacing detector. When employing a magnetic spacing detector having a detection bandwidth of less than 100 kHz, the length dimension $L_T$ of the calibration trough 200 may range between approximately 0.18 mm and 0.20 mm. In some applications, a magnetic spacing detector having a detection bandwidth on the order of 200 kHz may be employed. If such a magnetic spacing detector is used, the length dimensions $L_T$ of the calibration trough 200 may range between approximately 0.068 mm and 0.20 mm.

Figure 11:
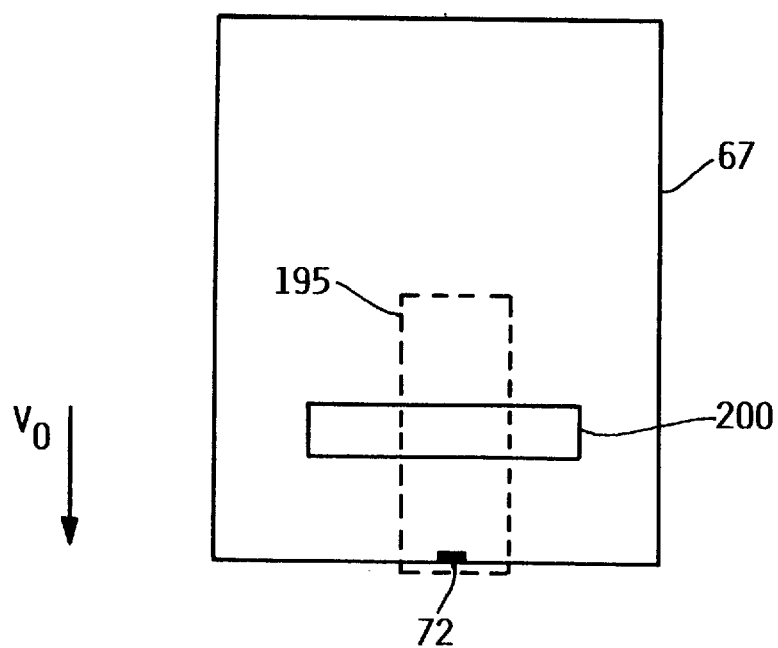
FIG. 11 is a top large scale top plan view of a slider with its supporting airbearing as the slider passes over the calibration trough.

By way of further example, FIG. 11 shows the slider 67 with its trailing supporting airbearing 195 as the calibration trough 200 passes directly underneath the slider 67 during the calibration procedure. It is noted that two other airbearings (not shown) are defined toward the leading edge of slider 67, with respect to the direction of disk 24 and calibration trough 200 rotation indicated by the arrow. These two airbearings are provided for purposes of enhancing slider 67 stabilization. The slider 67 is approximately 1.5 mm wide and 2.0 mm long. The center rail (not shown) of the slider 67, which serves as the airbearing surface, is located at the bottom of the pitched slider 67 and is about 0.4 mm wide. The airbearing 195 forms its supportive cushion immediately below the center rail of the slider 67.

Figure 12:
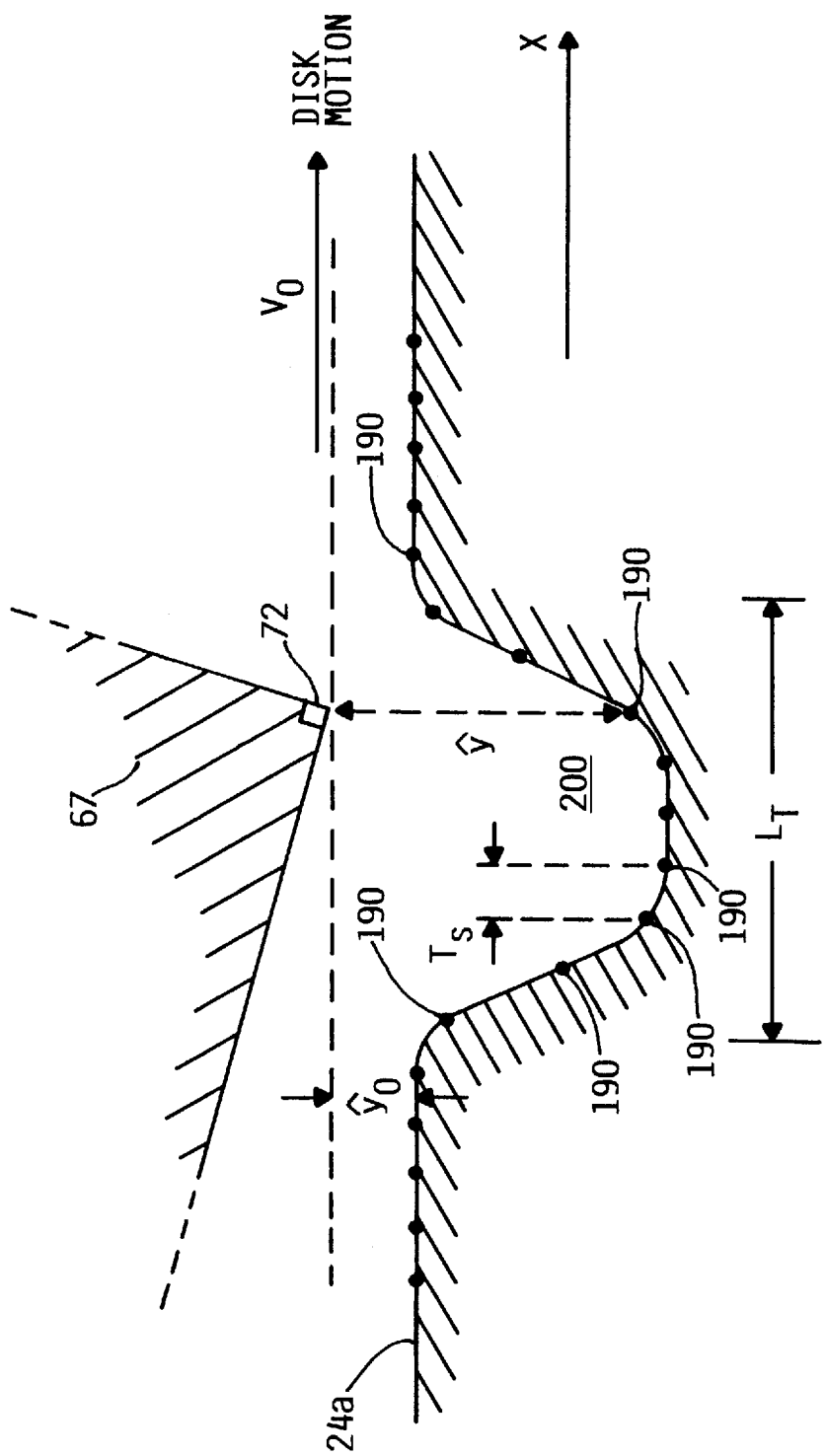
FIG. 12 shows a cross sectional view in the circumferential direction of the calibration trough and the slider depicted in FIG. 11.

FIG. 12 depicts a cross sectional view in the circumferential direction of the calibration trough 200 and the slider 67 with MR element 72. The diagram illustrates the relationship between the periodic spacing measurements in time and the corresponding physical measurement positions 190 on the disk surface 24a relative to the length $L_T$ of the calibration trough 200. Also shown in FIG. 12 is the spacing $T_S$ in time between two measurement positions 190. There exists a linear relationship between the length $L_T$ of the trough 200 and the time $T_L$ it takes the calibration trough 200 to pass by the MR element 72 at a given track radius $R_0$. This linear relationship is given by the Equation:

$$L_T = v_0 \cdot T_L \quad [4]$$

where, $v_0$ represents the linear velocity at a given track radius $R_0$ and a disk rotational velocity measured in RPM.

The magnetic and/or thermal measuring equipment or circuitry employed in the calibration procedure has a given detection bandwidth BW, measured in Hertz (Hz). This implies that the measuring equipment will not reliably measure signals that have frequency content higher than BW. The desired sampling rate $f_S$ of the switch 84 in the equipment 76, as depicted in FIG. 3 for example, should be several times the instrumentation bandwidth BW. The sampling rate is therefore given by the following Equation:

$$f_S = p \cdot BW \quad [5]$$

where, p is a constant ranging between 5 and 10. The sampling period is thus given by the following Equation:

$$T_S = 1/f_S. \quad [6]$$

Further, in order to effect an adequate calibration of the thermal sensitivity coefficient $S_T$ in Equation [2] above, it is desired to have several measurement samples m across the length $L_T$ of the trough 200. As such, the equation for determining the length $L_T$ of the calibration trough 200 is given by the following Equation:

$$L_T = v_0 \cdot m \cdot T_S \quad [7]$$

where, m is a positive integer. It is possible to incorporate all of the above-described constraints into a single equation for determining an appropriate length $L_T$ of the calibration trough 200, as is given by the following Equation:

$$L_T = \frac{\pi \cdot R_0 \cdot RPM \cdot m}{30 \cdot BW \cdot p} \quad [8]$$

As an example, assume that $R_0=18.4$ mm, RPM=7,200, m=5, BW=75 kHz, and p=5. The corresponding calibration trough length given these assumptions becomes $L_T=0.185$ mm.

The depth dimension $D_T$ of the calibration trough 200 need not be tightly controlled in comparison to the length and width dimensions. In general, the calibration trough 200 should be sufficiently deep to produce a measurable thermal and magnetic response in the MR element 72. At a minimum, the depth $D_T$ of the calibration trough 200 must be such that a thermal and magnetic response induce in the MR element 72 is discernible from the background thermal and magnetic spacing signal noise resulting from relatively small random or non-random surface features, which typically have heights on the order of 30 nm. As a general guideline, the minimum depth $D_T$ should produce a thermal and magnetic response that is more than twice that of the background noise. At a maximum, the depth $D_T$ of the calibration trough 200 must not be so excessive as to produce no magnetic response. Such a condition would preclude the opportunity to obtain a magnetic spacing measurement. In general, the maximum depth $D_T$ should not exceed approximately three to four times the nominal flying height of the MR element 72.

By way of example, the nominal flyheight of an MR element 72 for a particular data storage system may be on average approximately 60 nm in the landing zone. Using a multiplication factor of 3.5, a suitable calibration trough 200 for this exemplary data storage system configuration would have a depth $D_T$ of approximately 3.5×60 nm or 210 nm. As a general guideline, the depth $D_T$ of the calibration trough 200 for most system configurations ranges between approximately 60 nm and 240 nm.

The calibration depression may be fabricated inexpensively in a number of ways on both surfaces of a disk blank, such as by stamping, grinding, or embossing. The disk blank may then be subjected to polish and sputtering processes to permit both magnetic and thermal information to be obtained from the fabricated calibration depression. Alternatively, a laser texture tool may be employed to fabricate an elongated pit during a laser texture process. Creation of the elongated calibration pit may be accomplished using a higher power laser pulse once per revolution at a specified radial and circumferential location on the disk surface. Since a typical laser texture tool traces out a spiral during the procedure, an elongated depression may be created efficiently and inexpensively.

It will, of course, be understood that various modifications and additions can be made to the embodiments discussed hereinabove without departing from the scope or spirit of the present invention. Accordingly, the scope of the present invention should not be limited to the particular embodiments discussed above, but should be defined only by the full and fair scope of the claims set forth below.

We claim:

1. A method of calibrating a thermal response of a magnetoresistive (MR) element spaced apart from a surface of a data storage disk, the method comprising the steps of:

providing a calibration depression on the disk surface;

reading signals respectively from the calibration depression and a location on the disk surface other than the calibration depression;

producing magnetic spacing signals using the signals;

producing thermal spacing signals using the signals; and producing a calibrated thermal spacing signal using the magnetic spacing signals and the thermal spacing signals, such that the calibrated thermal spacing signal varies proportionally with respect to variations in spacing between the MR element and the disk surface.

2. The method of claim 1, wherein the step of producing the thermal spacing signals includes the steps of:

producing a first thermal spacing signal from the signal read from the calibration depression; and producing a second thermal spacing signal from the signal read from the disk surface location other than the calibration depression.

3. The method of claim 1, wherein the step of producing the magnetic spacing signals includes the steps of:

producing a first magnetic spacing signal from the signal read from the calibration depression; and producing a second magnetic spacing signal from the signal read from the disk surface location other than the calibration depression.

4. The method of claim 1, wherein the calibrated thermal spacing signal varies linearly with respect to variations in spacing between the MR element and the disk surface.

5. The method of claim 1, wherein the magnetic spacing signal varies linearly with respect to variations in spacing between the MR element and the disk surface.

6. The method of claim 1, wherein the providing step includes the further step of providing the calibration depression having a length $L_T$ that is approximated by an equation:

$$L_T = v_0 \cdot m \cdot T_S$$

where, $v_0$ represents a linear velocity of the calibration depression at a prescribed disk surface radius $R_0$, m represents a number of samples when reading the signals from the calibration depression, and $T_S$ represents a sampling period associated with a detection bandwidth.

7. The method of claim 1, wherein the providing step includes the further step of providing the calibration depression at either one of a disk surface location within a landing zone on the disk surface or a disk surface location other than a landing zone on the disk surface.

8. The method of claim 1, including the further step of magnetizing only the calibration depression and the location on the disk surface other than the calibration depression.

9. A method for calibrating a thermal response of a magnetoresistive (MR) element spaced apart from a surface of a data storage disk, the method comprising the steps of:

providing a calibration depression at a location on the disk surface;

reading a first signal from the calibration depression using the MR element;

reading a second signal from a disk surface location other than the calibration depression using the MR element;

producing a magnetic spacing difference signal using a magnetic component of the first and second signals, respectively;

producing a thermal spacing difference signal using a thermal component of the first and second signals, respectively; and producing a calibrated thermal spacing signal using the magnetic spacing difference signal and the thermal spacing difference signal.

10. The method of claim 9, wherein the step of producing the magnetic spacing difference signal includes the further step of using the magnetic component of the first and second signals, respectively, and a Wallace space loss equation.

11. The method of claim 9, wherein the calibrated thermal spacing change signal is approximated by an equation:

$$\Delta \hat{y}(x) = S_T \Delta T(x)$$

where, $\Delta \hat{y}(x)$ represents an estimated average separation distance between the MR element and the disk surface, $\Delta T(x)$ represents the thermal spacing difference signal, and $S_T$ represents a thermal sensitivity coefficient of the thermal response of the MR element.

12. The method of claim 9, wherein:

the step of reading the first signal includes the further step of reading the first signal from a maximum depth location of the calibration depression; and the step of reading the second signal includes the further step of reading the second signal from a disk surface location adjacent to the calibration depression.

13. An information storage device, comprising:

a transducer including a magnetoresistive (MR) element;

a storage medium having a surface, the medium surface including a calibration depression;

means for moving at least one of the transducer and the medium to provide a relative movement between the transducer and the medium, the transducer being arranged relative to the medium such that a spacing separates the MR element from the medium surface;

a read channel, coupled to the transducer, to read a signal respectively from the calibration depression and a location of the medium surface other than the calibration depression using the MR element;

a circuit, coupled to the read channel, for extracting a thermal signal component from the signals, and for extracting a magnetic signal component from the signals, and a processor, coupled to the circuit, for producing a calibrated thermal spacing signal using the thermal and magnetic signal components;

wherein the calibrated thermal spacing signal varies substantially linearly with respect to variations in spacing between the MR element and the medium surface.

14. The device of claim 13, wherein the calibration depression has a length $L_T$ that is approximated by an equation:

$$L_T = v_0 \cdot m \cdot T_S$$

where, $v_0$ represents a linear velocity of the calibration depression at a prescribed disk surface radius $R_0$, m represents a number of samples when reading the signals from the calibration depression, and $T_S$ represents a sampling period associated with a detection bandwidth.

15. The device of claim 13, wherein the calibration depression is located at either one of a medium surface location in a landing zone on the medium surface or a medium surface location other than a landing zone on the medium surface.

16. The device of claim 13, wherein the calibration depression has a width $W_T$ of approximately 1.0 millimeter, a length $L_T$ ranging between approximately 0.068 millimeter and approximately 0.20 millimeter, and a depth $D_T$ ranging between approximately 60 nanometers and approximately 240 nanometers.

17. The device of claim 13, wherein the calibration depression has a center located on the medium surface at a radial distance $R_0$ of approximately 18.4 millimeters with respect to a center of the storage medium.

18. The device of claim 13, wherein the calibration depression has a width $W_T$ that is greater than a width dimension of the MR element.

19. The device of claim 13, wherein:

the circuit has a magnetic detection bandwidth and a thermal detection bandwidth; and the calibration depression has a length $L_T$ such that the magnetic signal component and the thermal signal component are detectable within the magnetic and thermal detection bandwidths, respectively.

20. The device of claim 13, wherein an airbearing, having a length, is defined between the medium surface and the MR element, and the calibration depression has a length $L_T$ that is less than approximately one-tenth the length of the airbearing.

* * * * *